(12) United States Patent
Hecking

(10) Patent No.: US 7,681,584 B2
(45) Date of Patent: Mar. 23, 2010

(54) PIPE DISCONNECTOR

(75) Inventor: Willi Hecking, Niederkruchten-elmpt (DE)

(73) Assignee: Hans Sasserath & Co KG (DE)

( * ) Notice: Subject to any disclaimer, the term of this patent is extended or adjusted under 35 U.S.C. 154(b) by 399 days.

(21) Appl. No.: 11/481,134

(22) Filed: Jul. 3, 2006

(65) Prior Publication Data

US 2007/0000543 A1    Jan. 4, 2007

(30) Foreign Application Priority Data

Jul. 4, 2005    (DE) .................. 10 2005 031 422

(51) Int. Cl.
    *E03C 1/10* (2006.01)
(52) U.S. Cl. ............... 137/218; 137/115.16; 137/512.2
(58) Field of Classification Search .................. 137/218, 137/484.2, 512, 115.16, 115.2, 512.2, 542, 137/543, 454.2; 138/31
    See application file for complete search history.

(56) References Cited

U.S. PATENT DOCUMENTS

| 4,869,288 | A | * | 9/1989 | Toshio et al. ................. 137/494 |
| 5,031,969 | A | * | 7/1991 | Siegel ..................... 303/113.1 |
| 5,363,875 | A |   | 11/1994 | Vollmer |
| 2004/0035467 | A1 |   | 2/2004 | Hecking |

FOREIGN PATENT DOCUMENTS

| DE | 4204386 | | 8/1993 |
| DE | 19854951 | A1 | 6/2000 |
| DE | 19902574 | C1 | 10/2000 |
| DE | 10214747 | A1 | 10/2003 |
| DE | 20320356 | U1 | 5/2004 |
| DE | 103 35 379 | B3 | 11/2004 |
| WO | WO2005/012654 | A2 | 2/2005 |

\* cited by examiner

Primary Examiner—John Rivell
Assistant Examiner—Craig M Schneider
(74) Attorney, Agent, or Firm—Thorpe North & Western LLP

(57) ABSTRACT

A system disconnector for physically disconnecting an upstream liquid system from a downstream liquid system by means of an outlet valve (35;135) depending on the pressure difference between the upstream and the downstream liquid system comprises an upstream backflow preventer (48; 148), a downstream backflow preventer (88), and an outlet valve body in the form of a piston (26; 126) arranged between the backflow preventers (48, 88). The pressure difference at the outlet valve body (26; 126) between the inlet pressure and the medium pressure between the backflow preventers counteracts a biasing spring (82; 182) acting in the opening direction of the outlet valve body. An actuating member (64; 164), which is exposed to the inlet pressure on one side and to the medium pressure on the other side is adapted to move between two stops (54, 46; 171, 146) against the power of a spring (86; 182) to compensate for small changes in inlet pressure and prevent dripping of the valve.

11 Claims, 9 Drawing Sheets

PIPE DISCONNECTOR

TECHNICAL BACKGROUND

The invention relates to a system disconnector for physically disconnecting an upstream liquid system from a downstream liquid system.

System disconnectors or pipe disconnectors serve the purpose to safely prevent the backflow of liquid from a downstream liquid system to an upstream liquid system. The upstream liquid system may be a drinking water system. The downstream liquid system may be, for example, a heating system. It must be prevented under all circumstances, that contaminated water from the heating system flows back into the drinking water system when it is filled or re-filled, for example due to a pressure drop in the drinking water system for some reason. So called backflow preventers are known. These are spring biased valves allowing a liquid flow only in one direction, i.e. from the upstream to the downstream system. Such backflow preventers, however, can leak. Therefore, it is not permitted, for example with drinking water and heating water, to separate the liquid systems only by backflow preventers. A physical separation of the liquid systems must be effected in such a way, that in the case of a defect between the systems a connection to an outlet and the atmosphere is established.

System or pipe disconnectors comprise an upstream backflow preventer connected to the upstream liquid system and a downstream backflow preventer connected to the downstream system. A pressure controlled outlet valve is positioned between the backflow preventers, establishing the passage from the upstream liquid system to the downstream liquid system, if there is a sufficient pressure difference between the two liquid systems, so that the liquid can flow only from the upstream to the downstream liquid system. If there is no such pressure difference the outlet valve connects the space between the backflow preventers to the atmosphere and an outlet.

PRIOR ART

From DE 198 54 951 C2 an assembly is known, wherein the upstream backflow preventer is arranged within a coaxial metal bellow. When the inlet pressure increases, the metal bellow expands and moves the outlet valve until the valve seat sealingly abuts the valve cone of the outlet valve. Only then the upstream backflow preventer opens.

From DE 199 02 574 C1 an assembly is known, wherein a tubular, spring biased shut-off member of the outlet valve is movably guided with a piston with respect to a fixed casing bottom. The piston simultaneously serves as a pressure relief of the outlet valve.

DE 203 20 356 U1 discloses an assembly with two backflow preventer for a high pressure cleaning device. The upstream valve is sealed against the casing with a membrane seal. This is arranged in a spring biased outlet valve body.

In known pipe disconnectors which are disclosed, for example, in DE 102 14 747, the outlet valve is a piston adapted to be shifted in the casing of a fitting. This piston is provided with a central passage and an annular valve seat at its downstream end face, the valve seat axially abutting a fitting-fixed seat sealing. The passage establishes a connection closed to the atmosphere between the upstream and the downstream liquid system. The downstream backflow preventer is positioned in the passage. Thereby a pressure difference between the inlet pressure in the upstream liquid system and a medium pressure occurring in a medium pressure space between the piston and the downstream backflow preventer acts on the piston against a spring power in the opening direction. In order to achieve a flow towards the downstream system this pressure difference must exceed a given level determined by the spring power.

If, for example, a heating system shall be filled from a drinking water system through the system disconnector, at first the piston of the outlet valve is pushed by the inlet pressure of the drinking water system into its operating position against the power of the spring acting thereon, where it interrupts the connection to the atmosphere and to the outlet and establishes a connection between the drinking water system and the heating system. The upstream and downstream backflow preventers are then pushed open. Drinking water flows into the heating system for filling or re-filling. The heating system is filled up to an outlet pressure which is lower than the inlet pressure. During normal operation the difference between the inlet pressure and the outlet pressure is determined by the pressure drop at the backflow preventers, i.e. by the power of the springs of the backflow preventers. According to the pressure drop at the upstream backflow preventer and the pressure drop at the downstream backflow preventer, the medium pressure is at a level there between. The pressure difference between the inlet pressure and the medium pressure must be larger than a threshold value determined by the spring power of the valve body of the outlet valve.

The inlet pressure may vary. This can lead to the pressure difference between the inlet pressure and the medium pressure dropping below the threshold value. In this case the outlet valve opens to atmosphere. A small amount of water flows out. This causes an immediate dropping of the medium pressure. The outlet valve closes again. The variations of the inlet pressure cause dripping of the outlet valve. This dripping is unnecessary, because the pressure variations of the inlet pressure are not critical. The heating water does not flow backwards into the drinking water system through the tight downstream backflow preventer.

DISCLOSURE OF THE INVENTION

It is an object of the invention to avoid an unnecessary opening of the outlet valve due to pressure variations of the inlet pressure.

The inventive assembly comprises an actuating member limiting the medium pressure space, which is exposed to the inlet pressure on one side and to the medium pressure on the other side and which is adapted to move between two stops against the power of a spring.

Normally the actuating member is held in abutment to a stop on the medium pressure side by the pressure difference. If the inlet pressure drops, the actuating member moves away from the stop under the influence of the spring. Thereby, the volume of the medium pressure space is increased. As the medium pressure space is closed in its stationary state and the liquid is non-compressible, a small movement of the actuating member causes a decrease of the medium pressure. The medium pressure, therefore, follows the decreasing inlet pressure to a certain extent. By this movement, the spring of the actuating member is expanded. A new equilibrium is achieved where a slightly decreased pressure difference, which still does not cause the outlet valve to open, keeps the balance with the slightly expanded spring. If the inlet pressure drops severely, the actuating member finally ends up at the other stop. A further drop of the inlet pressure causes the pressure difference to decrease below the threshold value mentioned above and causes the outlet valve to open towards atmosphere.

If the medium pressure increases because the downstream backflow preventer leaks, the actuating member is pushed against the "outer" stop. Then the pressure difference decreases below the threshold value and the outlet valve operates in the normal way.

Preferably the biased spring is supported upstream by the actuating member and the spring power acts on the outlet valve body through the actuating member when its upstream stop is reached, so that the biased spring acting on the actuating member simultaneously serves as a biased spring acting on the outlet valve body. In such a way less springs are needed. There are no separate springs necessary for the actuating member and the outlet valve body anymore. Moreover, the same spring can be used for both components. As the manufacturing tolerances for the springs add up, the adjustment accuracy for the pressure difference can be improved in such a way.

In the operating position the common biased spring pushes against the actuating member, so that it abuts the upstream stop. In this case the spring power is effective also on the outlet valve body. The outlet valve body in turn is held in its position by the spring power against the inlet pressure.

At a small increase of the inlet pressure, the actuating member is moved against the spring power of the common biased spring up to the downstream stop. If the pressure is further increased the backflow preventer will open.

A preferred embodiment of the invention provides that
(a) the upstream backflow preventer is arranged inside the outlet valve body which is provided with a central passage,
(b) the actuating member is a piston with a central passage, which in turn is guided between the stops,
(c) a valve seat of the backflow preventer is arranged in the piston, and
(d) a spring biased valve seat body of the backflow preventer is arranged on the valve seat.

Modifications of the invention are subject matter of the subclaims. An embodiment of the invention is described below in greater detail with reference to the accompanying drawings.

DETAILED DESCRIPTION OF THE ILLUSTRATED EMBODIMENTS

Embodiment 1

Figure 1:
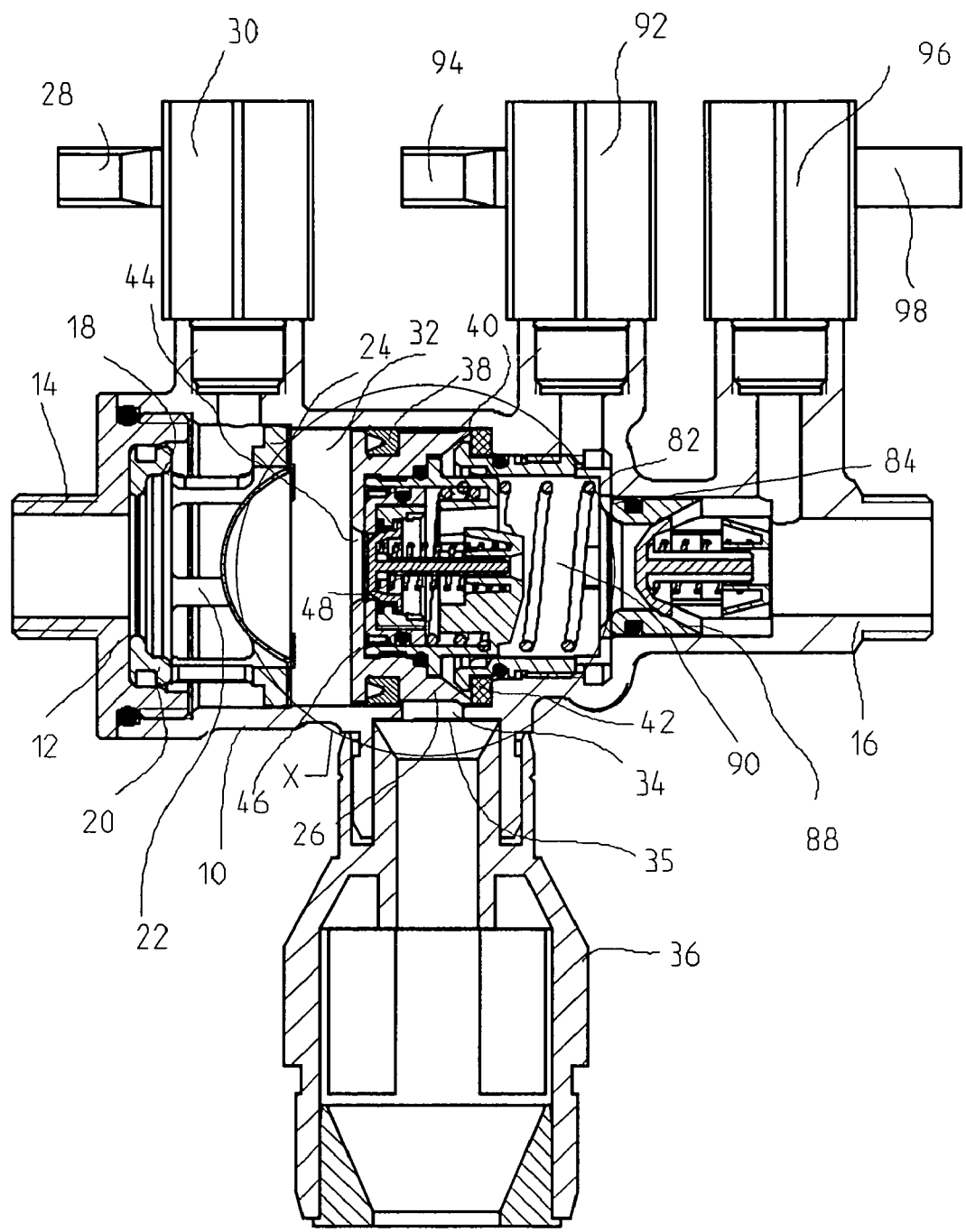
FIG. 1 shows a longitudinal section through a pipe disconnector with a compensation piston.

In FIG. 1, numeral 10 denotes a pipe-shaped fitting casing. At its inlet side end the fitting casing 10 is closed by a plug 12. The plug 12 is provided with an inlet socket 14. On the opposite end, fitting casing 10 is provided with an outlet socket 16. Next to the plug 12, a support body 18 is arranged in the fitting casing 10. The support body 18 defines a first ring 20 which is connected to a second ring 24 by webs 22. The second ring defines a stop for an outlet valve body which is formed by a piston 26. Between the webs, the inlet socket 14 is connected with a test connection 28 to a ball valve 30. Through this test connection 28, the inlet pressure can be measured by means of a pressure gauge.

A cylindrical chamber 32 is defined by the fitting casing 10. A piston 26 is guided inside the chamber 32. An outlet 34 branches off the chamber 32, which is provided with an outlet socket 36 connected to the atmosphere.

The piston 26 serves as an outlet valve body. The piston 26 is guided in the cylindrical chamber 32 sealed with a seal 38 on its outer surface. A downstream end face of the piston 26 defines an annular valve seat 40. In its downstream end position as shown in FIG. 1, the valve seat 40 abuts a seat sealing 42. The piston 26 covers the outlet 34 with its outer surface. This is an outlet valve 35.

Figure 2:
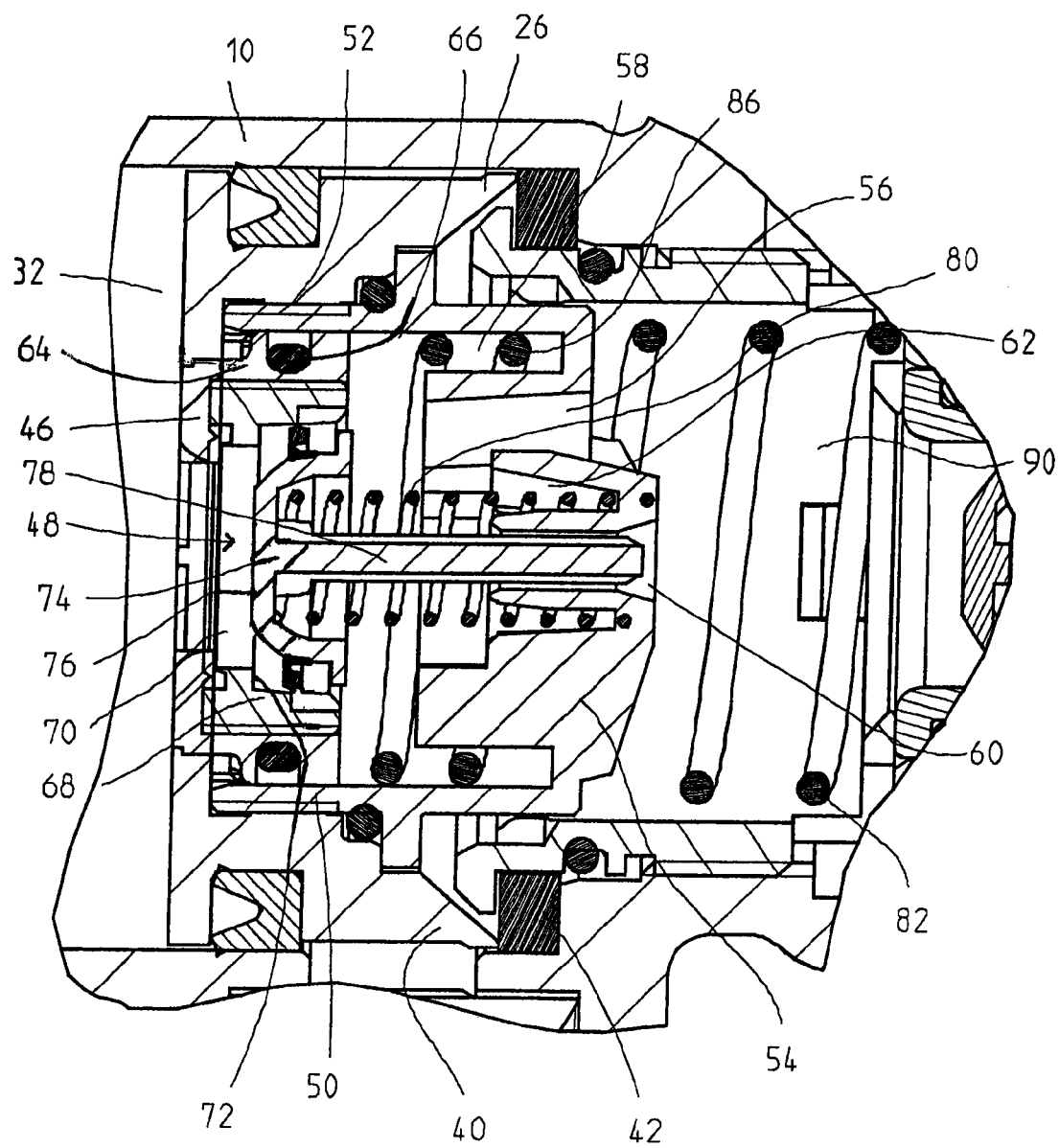
FIG. 2 shows a view "X" of FIG. 1, where the compensation piston is moved by the pressure difference to its medium pressure side stop.

The piston 26 is provided with a central passage 44. At the upstream end of the piston 26, a flat annular rim 46 is formed extending toward the inside. An upstream backflow preventer 48 is positioned in the passage. The casing 50 of the backflow preventer 48 (FIG. 2) is provided with a sleeve-shaped outer jacket portion 52. This jacket portion 52 is an integral part of an annular body 54. The annular body 54 is provided with an excentric axial passage 56. Furthermore, the annular body 54 has an annular groove 58 along its circumference. A further annular groove 62 is formed around a central recess 60 of the annular body 54. The annular grooves 58 and 62 are open towards the upstream side. A compensation piston 64 is guided in the jacket portion 52. The compensation piston 64 is sealed against the inner surface of the jacket portion 52 by means of a sealing ring 66. The compensation piston 64 is adapted to be moved between two stops. A downstream stop is defined by the end face of the annular body 54 at the edge of the annular groove 58. An upstream stop is defined by the rim 46 of the piston 26, where the compensation piston 64 abuts with an annular projection 68. The compensation piston 64 is cup-shaped and has a cylindrical jacket and a central recess 70.

A valve seat 72 of the upstream backflow preventer is arranged in the compensation piston 64. The valve seat 72 cooperates with an outlet valve body 74. The outlet valve body 74 is provided with a conical head 76 and a shaft 78. The shaft 78 extends through the recess 60. The shaft 78 is surrounded by a helical spring 80. The helical spring 80 is guided with an end in the annular groove 62 and abuts the head 76 with the other end. A helical spring 82 is supported on a shoulder 84 on the inside of the fifing casing 10 and upstream abuts the annular body 54. Thereby the piston 26 of the outlet valve is biased in the upstream direction by the spring 82 through the annular body 54.

A helical spring 86 is positioned in the annular groove 58 of the annular body 54. The helical spring 86 abuts the downstream end face of the compensation piston 64. The helical spring 86 biases the compensation piston toward the upstream side. The helical spring 86 counteracts the pressure difference between the inlet pressure and the pressure behind the upstream backflow preventer.

Downstream of the described assembly, a downstream backflow preventer is arranged in the fitting casing. The backflow preventer is denoted by numeral 88. The backflow preventer 88 has a design which is principally similar to the upstream backflow preventer 48 and is, therefore, not described in detail. Both backflow preventers 48 and 88 open in the direction from the inlet pressure to the outlet pressure. A medium pressure space 90 is formed between the piston 26 and the downstream backflow preventer 88. The medium pressure space 90 is connected to a test connection 94 through a ball valve 92. The medium pressure can be measured through this test connection. The outlet socket 16 wherein there is outlet pressure is connected to a test connection 98 through a ball valve 96.

The helical spring 80 of the backflow preventer 48 is stronger than the helical spring 82 acting on the piston 26. Thereby the backflow preventer only opens if the piston 26 has been moved to its downstream end position by the pressure difference between the inlet pressure and the medium pressure in the medium pressure space. If the passage towards the outlet socket with respect to the outlet 34 and the atmosphere is closed in such a way the backflow preventers are pushed open by the water pressure. The heating system is filled to an outlet pressure which is slightly lower than the inlet pressure. Under the influence of pressure difference and against the influence of the helical spring 86, the compensation piston 64 abuts the downstream stop, i.e. the end face of the annular body 54.

Figure 3:
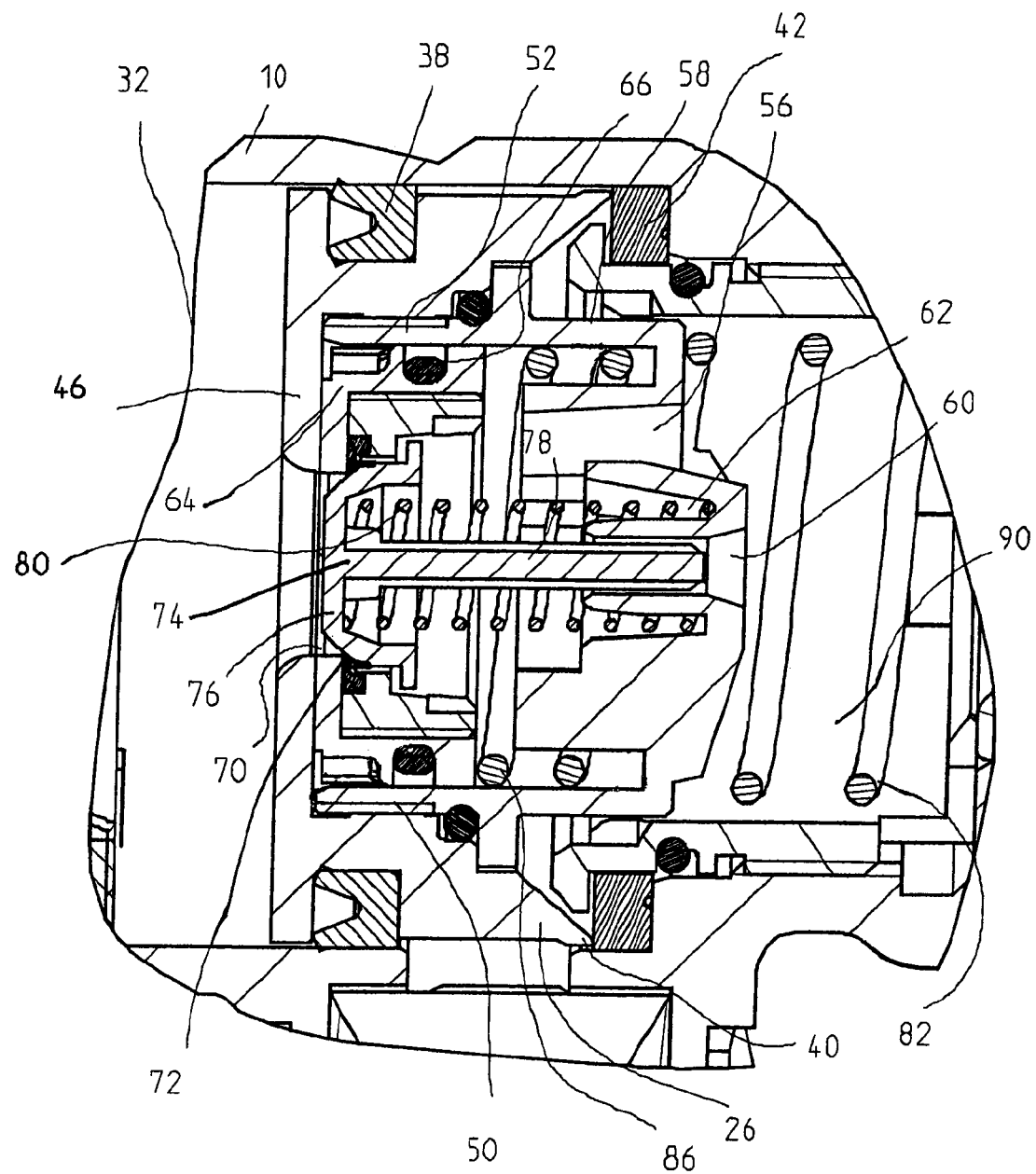
FIG. 3 shows a view "X" of FIG. 1, where the compensation piston is moved by the pressure difference to its inlet side stop.

If, based on this state, a pressure variation of the inlet pressure occurs, the helical spring moves the compensation piston 64 towards the upstream side. Thereby the volume of the medium pressure space 90 is increased and the medium pressure also decreases. The helical spring 86 slightly expands. A new equilibrum is achieved where the slightly lower pressure difference counteracts the spring power of the slightly expanded helical spring 86. The piston 26, however, is not yet moved. With a larger pressure drop of the inlet pressure the pressure difference linearly decreases with the expanding of the helical spring but less than the decrease of the inlet pressure. Finally, the compensation piston reaches the upstream stop while the annular projection 68 abuts the rim 46 of the piston 26. This is shown in FIG. 3. Now a further drop of the inlet pressure cannot be compensated by an increase of the volume of the medium pressure space 90. A further pressure drop of the inlet pressure causes the pressure difference to decrease below the threshold value. The piston 26 is pushed to its upstream end position by the helical spring 82. Then it lifts the valve seat 40 from the seat sealing 42 and establishes a connection to the outlet 34.

Figure 4:
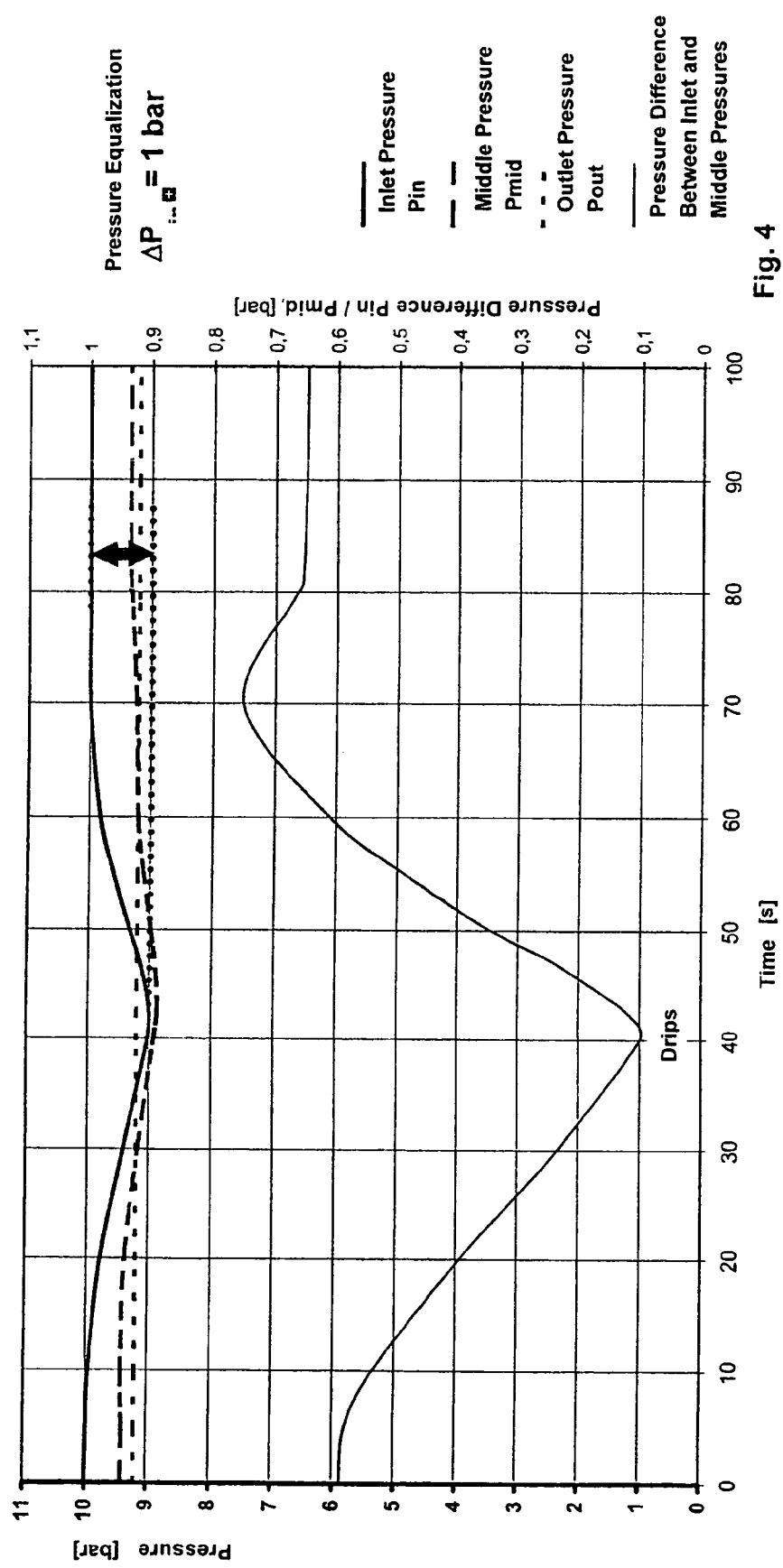
FIG. 4 is a diagram and illustrates the effect of the pipe disconnector without compensation piston.
Figure 5:
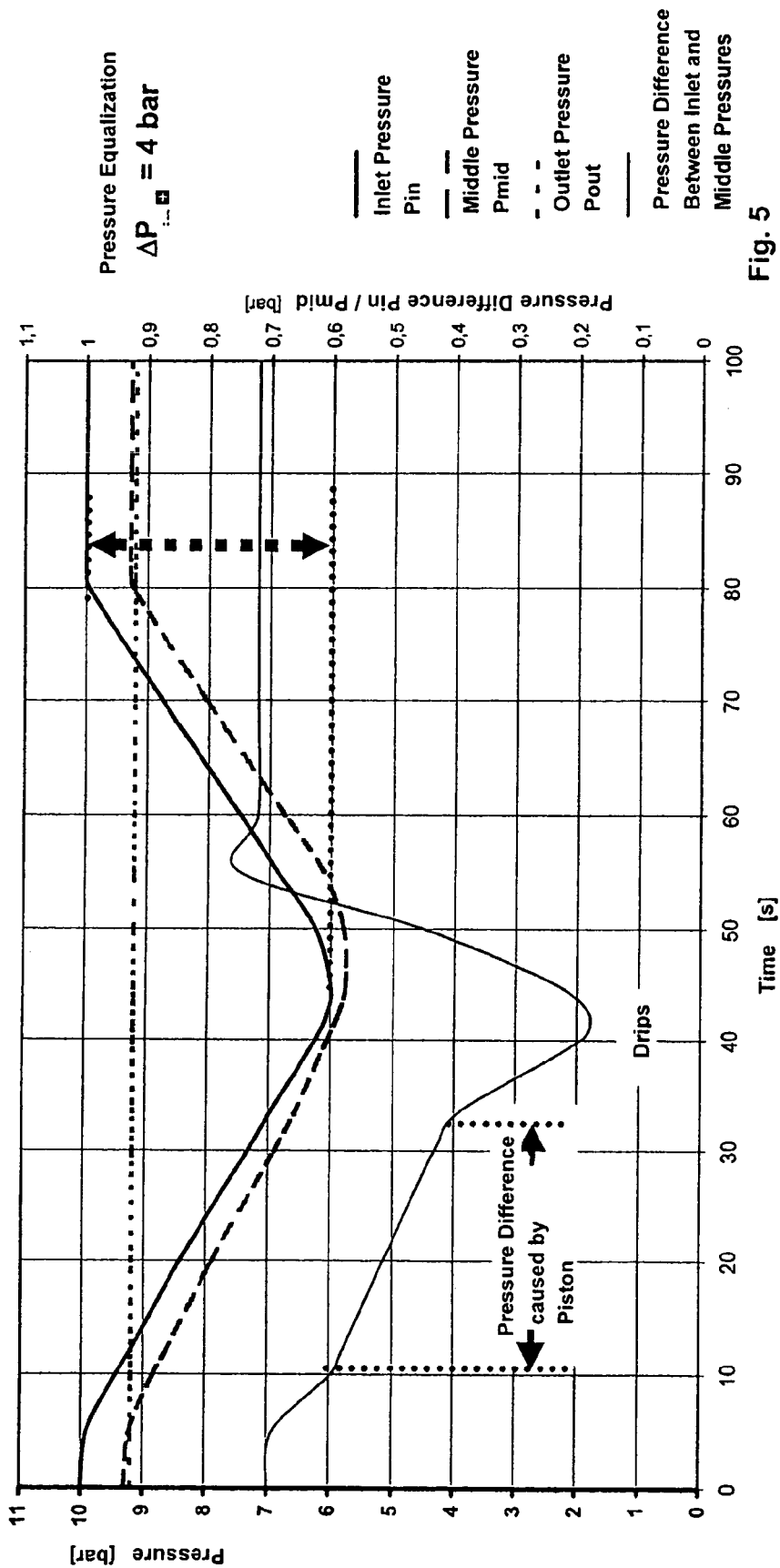
FIG. 5 is a diagram and illustrates the effect of the pipe disconnector with a compensation piston.

The behavior of the system or pipe disconnector is described relating to FIG. 4 and FIG. 5. These figures show diagrams which were measured with pipe separators without and with the described compensation piston, respectively.

It can be seen from both diagrams, that the outlet pressure normally is slightly below the inlet pressure. The pressure difference between the inlet and medium pressure is between 0.6 and 0.7 bar or a little more than 0.7 bar. The outlet valve with the piston 26 responds when the pressure difference drops below 0.4 bar. Then the pipe separator "drips". A relatively small pressure variation of the inlet pressure, as shown in FIG. 4, leads to a quick and strong decrease of the pressure difference between the inlet pressure and the medium pressure, as is shown by a thin continuous line. The pipe separator drips over a relatively long time period until the inlet pressure reaches its normal value again.

In FIG. 5 the corresponding graphs are shown for a pipe separator of the above mentioned kind. It can be seen that the pressure difference in the area of 10 seconds to about 32 seconds linearly decreases with a small inclination due to the pressure compensation with the compensation piston. Only then a larger drop of the pressure difference occurs which causes a dripping of the pipe disconnector.

Thereby an unnecessary opening of the outlet valve is avoided. The pressure compensation, however, moves within an uncritical pressure range. If heating water flows back through a leaking downstream backflow preventer the compensation piston immediately moves to its upstream end position. Then there is no pressure compensation and the outlet valve responds immediately.

The system disconnector according to this embodiment comprises an assembly using four springs. One spring is provided for each of the backflow preventers. A further spring serves for biassing the outlet valve body. A fourth spring biases the actuating member which compensates small pressure variations of the inlet pressure. Each of the springs has a spring power with a certain tolerance. When the pressure conditions are adjusted these tolerances add up.

Embodiment 2

The assembly shown in FIGS. 6-9 serves for the same purpose and is identical to the fitting of the first embodiment apart form the piston assembly described below.

Figure 6:
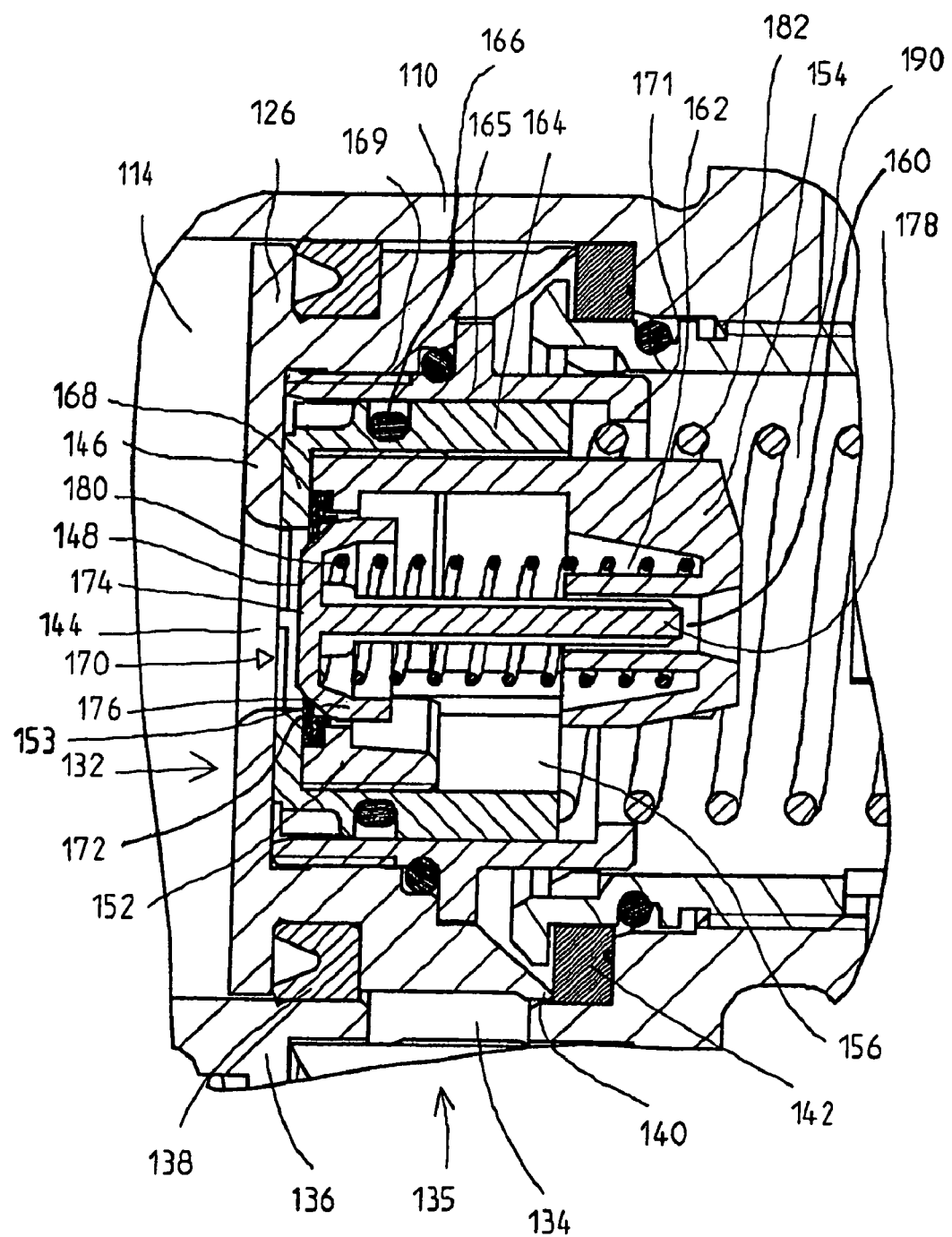
FIG. 6 shows a detail of a system disconnector according to a second embodiment of the invention in its operating position with the outlet valve in closed position.

In FIG. 6 numeral 110 denotes a pipe-shaped fitting casing. The fitting casing 110 is provided with an inlet 114. At its opposite end the fitting casing 110 is provided with an outlet (not shown). A stop for an outlet valve body defined by a piston 126 is provided in the fitting casing 110.

A cylindrical chamber 132 is defined by the fitting casing 110. A piston 126 is guided inside the chamber 132. An outlet 134 branches off the chamber 132, which is provided with an outlet socket 136 connected to the atmosphere.

The piston 126 serves as an outlet valve body. The piston 126 is guided in the cylindrical chamber 132 sealed with a seal 138 on its outer surface. A downstream end face of the piston 126 defines an annular valve seat 140. In its downstream end position as shown in FIG. 6 the valve seat 140 abuts a seat seal 142. The piston 126 covers the outlet 134 with its outer surface. This is an outlet valve 135.

The piston 126 is provided with a central passage 144. At the upstream end of the piston 126 a flat annular rim 146 is formed extending toward the inside. An upstream backflow preventer, generally denoted with numeral 148, is positioned in the passage 144.

The backflow preventer 148 is provided with a seat portion 152. The seat portion 152 defines the valve seat 172 of the backflow preventer 148. The seat portion is downwardly open in FIG. 7 and extends in an axial direction over the entire length of the backflow preventer 148. A spring abutment body 154 is integral with the seat portion 152. The spring abutment body has an excentric, axial passage 156. Furthermore, the spring abutment body 154 has an annular groove 162 around a central recess 160 in an axial direction in the spring abutment body 154. The annular groove 162 is open towards the upstream side. The spring abutment body 154 defines a spring abutment in the annular groove 162 for a helical spring 180.

The valve seat 172 cooperates with a valve closing body 174. The valve closing body 174 is provided with a conical head 176 and a shaft 178. The shaft 178 extends through the recess 160. The shaft 178 is surrounded by a helical spring 180. The helical spring 180 is guided with an end in the annular groove 162 and abuts the head 176 with the other end.

The seat body 152 is screwed into an actuating member 164 in the form of a compensation piston. The compensation piston 164 is cup-shaped and has a cylindrical jacket and a central recess 170. A compensation piston 164 is guided in a guiding cylinder 165. The guiding cylinder 165 is screwed with a thread 169 into the outlet valve body 126 and sealed against its inner surface by means of a sealing ring 166. The guiding cylinder 165 is provided with a rim 171 extending toward the inside. This rim 171 serves as a stop for the compensation piston 164. An upstream stop is defined by the rim 146 of the piston 126, where the compensation piston 164 abuts the rim 146 with an annular projection 168.

A helical spring 182 is supported on a shoulder (not shown) on the inside of the fining casing 110 and upstream abuts the downstream end face of the compensation piston 164. The helical spring 182 pushes the compensation piston in an upstream direction against the rim 146. Through the compensation piston, the spring power of the spring 182 also biases the rim 146. Thereby the outlet valve body 126 of the outlet valve is biased by the spring 182 through the rim 146. The helical spring 182 counteracts the pressure difference between the inlet pressure and the pressure behind the upstream backflow preventer 148.

Downstream of the described assembly, a downstream backflow preventer (not shown) is arranged in the fining casing. The downstream backflow preventer has a design which is principally similar to the upstream backflow preventer 148 and is therefore, not described in detail. Both backflow preventers open in the direction from the inlet pressure to the outlet pressure.

A medium pressure space 190 is formed between the outlet valve body 126 and the downstream backflow preventer.

Figure 7:
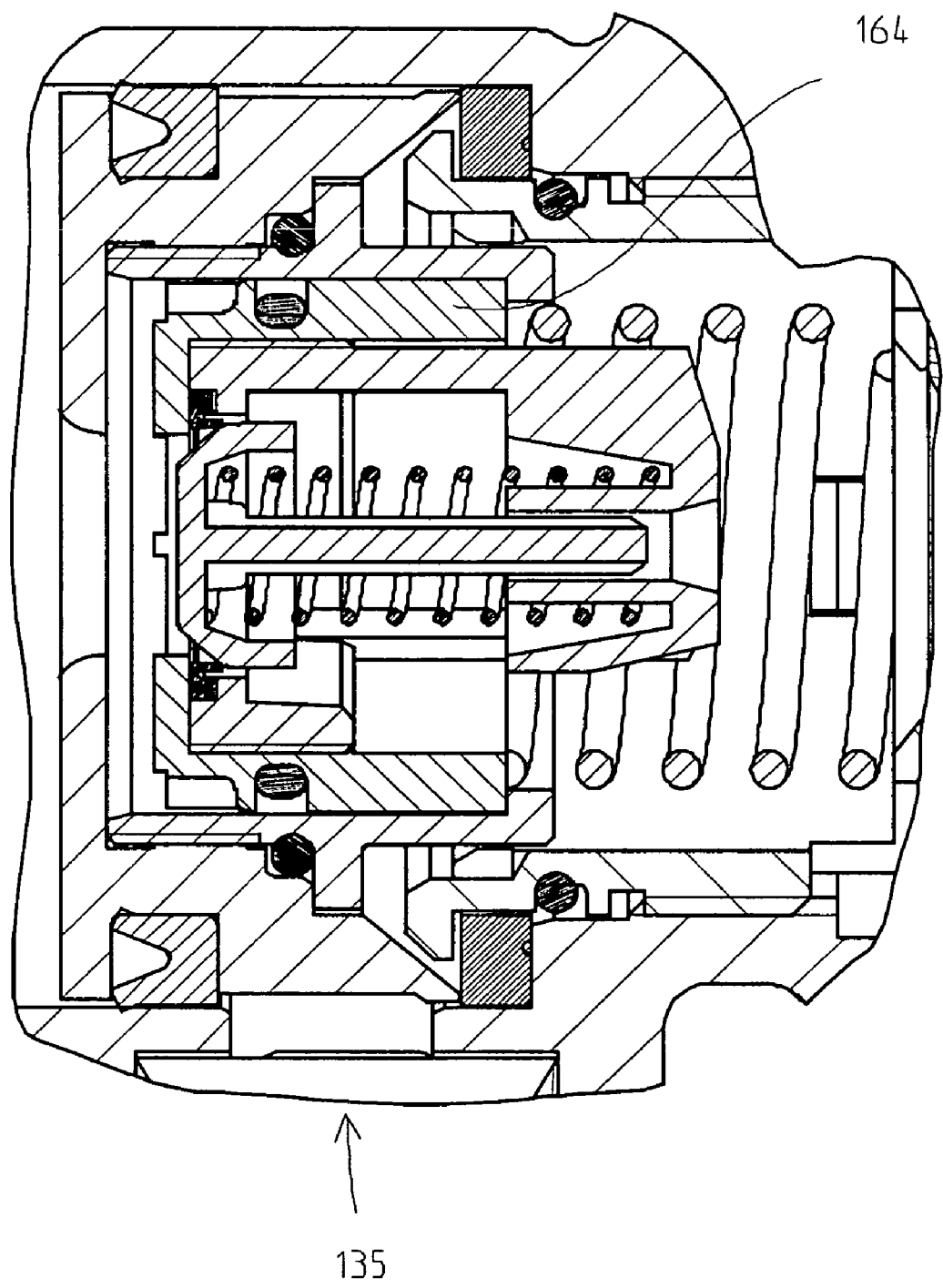
FIG. 7 shows a detail of the system disconnector of FIG. 6 in its compensation position.
Figure 8:
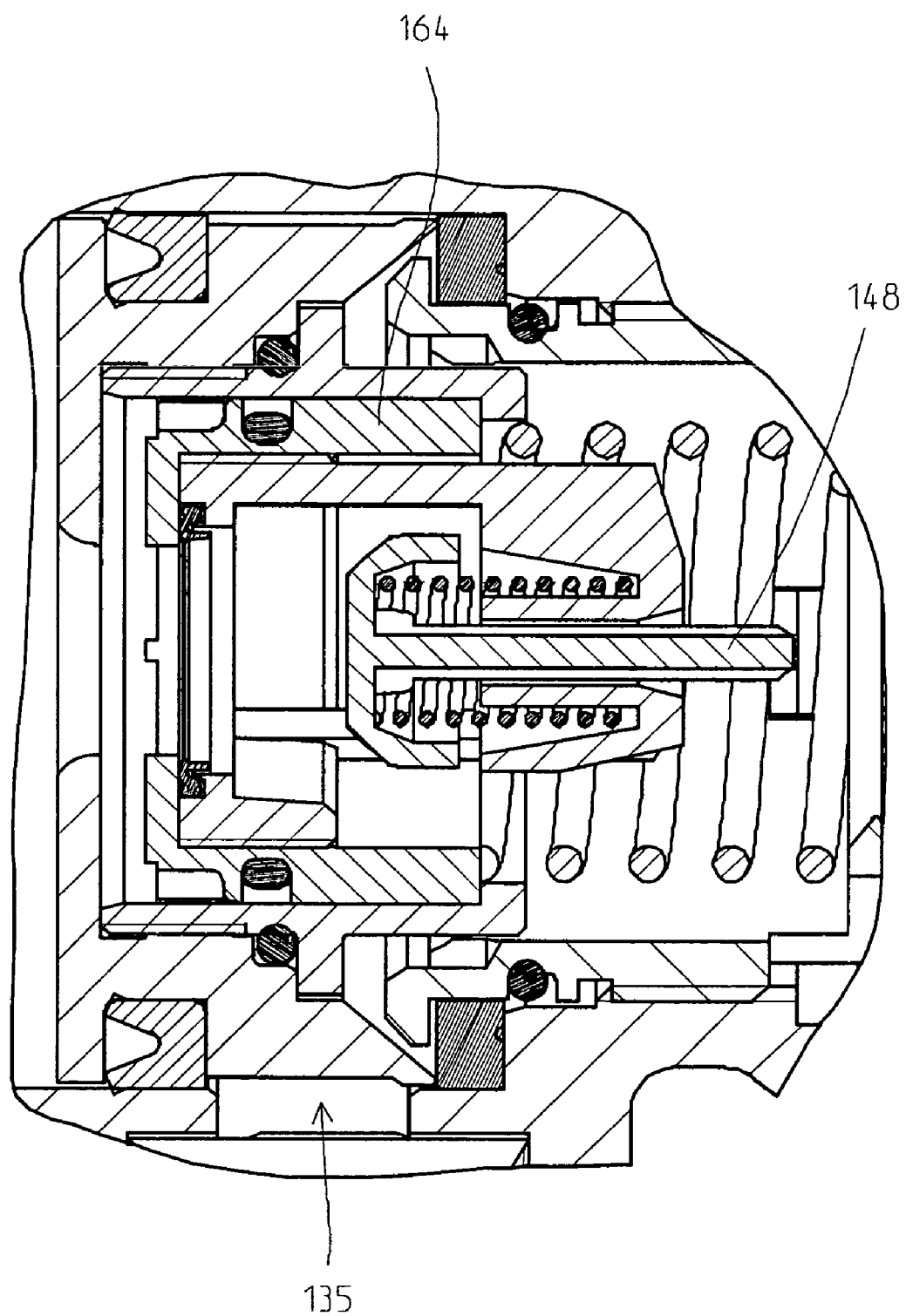
FIG. 8 shows a detail of the system disconnector of FIG. 6 in its flow position.

The helical spring 180 of the backflow preventer 148 is stronger than the helical spring 182 acting on the outlet valve body 126 and the compensation body 164. Thereby the backflow preventer only opens if the outlet valve body 126 and the compensation piston 164 has been moved to its downstream end position by the pressure difference between the inlet pressure and the medium pressure in the medium pressure space. This situation is shown in FIGS. 7 and 8. In FIG. 6 the assembly is shown in its operating position with the outlet valve 135 in closed position. The compensation piston is in its upstream end position, the outlet valve 135 is closed, and the backflow preventer 148 is closed. In FIG. 7 the situation with a slightly increased inlet pressure is shown. In this "compensation position" the compensation piston 164 is moved towards the right in the figure to its downstream end position against the pressure of the spring 182. However, the backflow preventer is completely closed.

The passage position is shown in FIG. 8. The compensation piston 164 is in its downstream end position and the backflow preventer 148 is opened. The outlet valve 135 is closed.

If the passage toward the outlet socket with respect to the outlet 135 and the atmosphere is closed the backflow preventers are pushed open by the water pressure. The heating system is filled to an outlet pressure which is slightly lower than the inlet pressure. Under the influence of pressure difference and against the influence of the helical spring 182, the compensation piston 164 abuts the downstream stop, i.e. the rim 171 extending toward the inside, as it is shown in FIG. 8.

If a pressure variation of the inlet pressure occurs, the helical spring moves the compensation piston 164 towards the upstream side. Thereby the volume of the medium pressure space 190 is increased and the medium pressure also decreases. The helical spring 182 slightly expands. A new equilibrum is achieved, which is shown in FIG. 7, where the slightly lower pressure difference counteracts the spring power of the slightly expanded helical spring 182. The piston 126, however, is not yet moved.

With a larger pressure drop of the inlet pressure, the pressure difference linearly decreases with the expanding of the helical spring but less than the decrease of the inlet pressure. Finally, the compensation piston reaches the upstream stop while the annular projection 168 abuts the rim 146 of the outlet valve body 26. This operating position is shown in FIG. 6.

Figure 9:
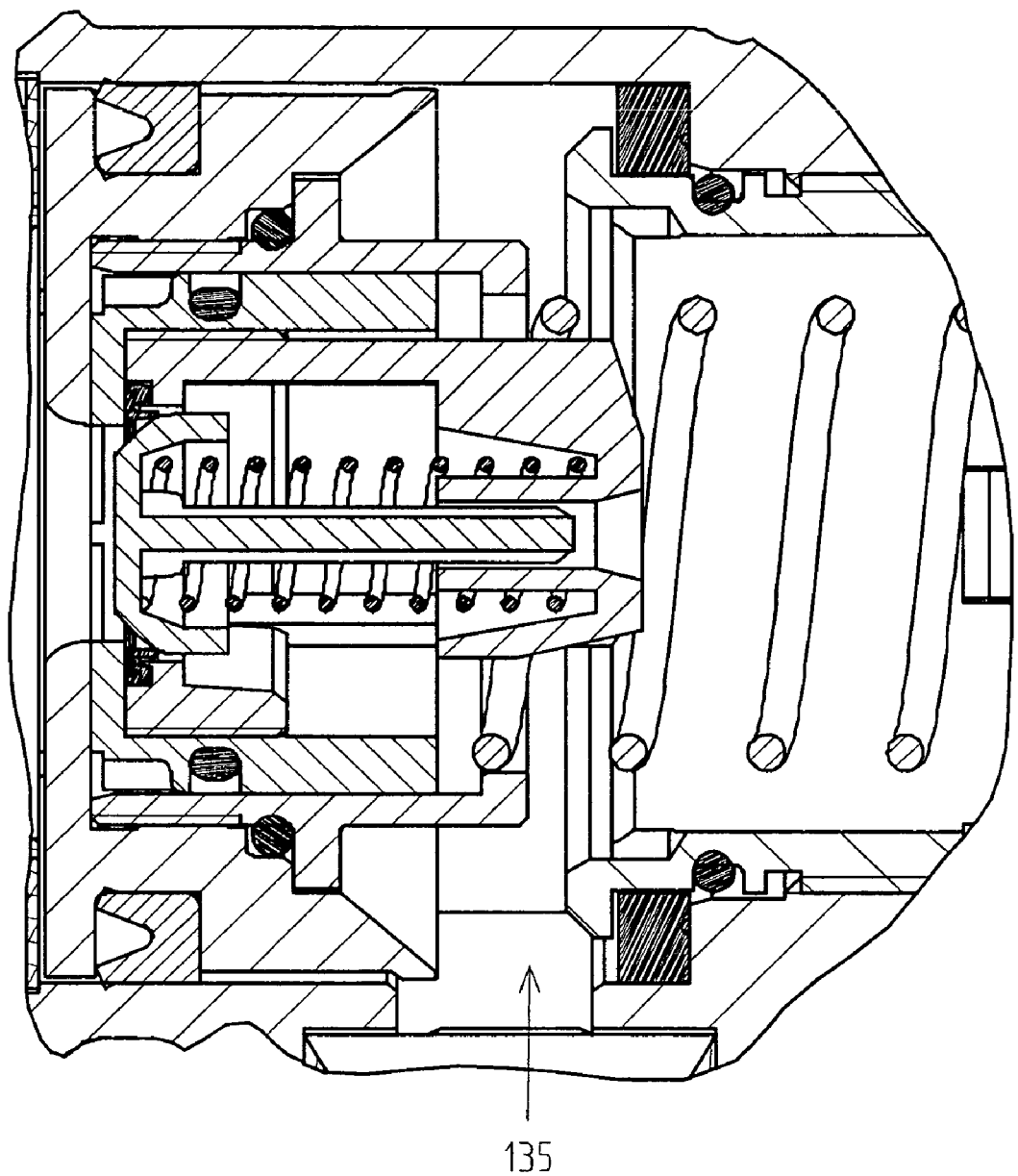
FIG. 9 shows a detail of the system disconnector of FIG. 6 in its disconnecting position.

Now a further drop of the inlet pressure cannot be compensated by an increase of the volume of the medium pressure space 190. A further pressure drop of the inlet pressure causes the pressure difference to decrease below the threshold value. The outlet valve body 126 is pushed to its upstream end position by the helical spring 182. Then it lifts the annular valve seat 140 from the annular sealing 142 and establishes a connection to the outlet 135. This disconnecting position is shown in FIG. 9

The behavior of the system or pipe disconnector remains unchanged with respect to the first embodiment. An unnecessary opening of the outlet valve is avoided.

As the outlet valve body and the actuating member have different effective diameters in the present embodiment, the necessary sequence of the opening movements, i.e. first the outlet valve body, then the compensation piston and finally the backflow preventer or the closing movements in the opposite sequence are automatically set when the spring power is the same.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

The invention claimed is:

1. A system disconnector for physically disconnecting an upstream liquid system with an upstream inlet pressure from a downstream liquid system with a downstream pressure, said upstream and downstream pressures defining a pressure difference, the system disconnector comprising:
   an outlet valve, said outlet valve being adapted to open and close depending on said pressure difference between the upstream and the downstream liquid system;
   an upstream backflow preventer;
   a downstream backflow preventer; and
   an outlet valve body in the form of a piston arranged between said upstream and downstream backflow preventers, said outlet valve body moving in an opening and a closing direction;
   wherein
   a space is defined upstream of said upstream backflow preventer, said space being exposed to said inlet pressure of said upstream liquid system;
   a medium pressure space is defined between said outlet valve body and said downstream backflow preventer, said medium pressure space being exposed to a medium pressure;
   a space is defined downstream of said downstream backflow preventer, said space being exposed to said outlet pressure of said downstream liquid system;
   a biasing spring is provided acting in said opening direction of said outlet valve body; and said pressure difference at said outlet valve body between said inlet pressure and said medium pressure counteracts said biasing spring;

and wherein an actuating member is provided, said actuating member limiting said medium pressure space;

said actuating member has an upstream and a downstream side, said upstream side being exposed to said inlet pressure and said downstream side being exposed to said medium pressure; and two stops are provided, said actuating member being adapted to move between said two stops against the power of a spring.

2. A system disconnector according to claim 1, characterised in that said outlet valve body is provided with a central passage; said actuating member takes the form of a piston positioned in said central passage to move between said two stops; and said actuating member includes a central recess; and said upstream backflow preventer is formed in said actuating member and includes an upstream backflow preventer outlet valve body positioned within said actuating member central recess.

3. A system disconnector according to claim 1, characterised in that said upstream backflow preventer is arranged in said actuating member, and said actuating member is formed as a piston within a central recess of the outlet valve body, said actuating member being guided between said stops by said central recess of the outlet valve body.

4. A system disconnector according to claim 3, characterised in that
   (a) a valve seat of said upstream backflow preventer is arranged in said central recess of said actuating member; and
   (b) a spring biased upstream backflow preventer valve body of said upstream backflow preventer is arranged on said valve seat.

5. A system disconnector for physically disconnecting an upstream liquid system with an upstream inlet pressure from a downstream liquid system with a downstream pressure, said upstream and downstream pressures defining a pressure difference, the system disconnector comprising:

an outlet valve, said outlet valve being adapted to open and close depending on said pressure difference between the upstream and the downstream liquid system;

an upstream backflow preventer;

a downstream backflow preventer; and an outlet valve body in the form of a piston arranged between said upstream and downstream backflow preventers, said outlet valve body moving in an opening and a closing direction;

wherein a space is defined upstream of said upstream backflow preventer, said space being exposed to said inlet pressure of said upstream liquid system;

a medium pressure space is defined between said outlet valve body and said downstream backflow preventer, said medium pressure space being exposed to a medium pressure;

a space is defined downstream of said downstream backflow preventer, said space being exposed to said outlet pressure of said downstream liquid system;

a biasing spring is provided acting in said opening direction of said outlet valve body; and said pressure difference at said outlet valve body between said inlet pressure and said medium pressure counteracts said biasing spring;

and wherein an actuating member is provided, said actuating member limiting said medium pressure space;

said actuating member has an upstream and a downstream side, said upstream side being exposed to said inlet pressure and said downstream side being exposed to said medium pressure; and two stops are provided, said actuating member being adapted to move between said two stops against the power of said biasing spring.

6. A system disconnector according to claim 5, characterised in that said outlet valve body is provided with a central passage; said actuating member takes the form of a piston positioned in said central passage to move between said two stops; and said actuating member includes a central recess; and said upstream backflow preventer is formed in said actuating member and includes an upstream backflow preventer outlet valve body positioned within said actuating member central recess.

7. A system disconnector according to claim 5, characterised in that said biasing spring is supported by said actuating member on said upstream side of said spring and said spring power acts on said outlet valve body after said actuating member reaches said upstream stop, so that said biasing spring acting on said actuating member simultaneously serves as a biasing spring for said outlet valve body.

8. A system disconnector according to claim 7, characterised in that said outlet valve body includes an axial guiding cylinder therein which receives and guides said actuating member as a piston inside the guiding cylinder, said guiding cylinder is downstream provided with a rim inwardly extending, which defines a downstream stop for said piston, and said guiding cylinder being open toward said upstream side, so that said outlet valve body defines an upstream stop for said piston actuating member.

9. A system disconnector according to claim 5, characterised in that said upstream backflow preventer is arranged in said actuating member, and said actuating member is formed as a piston within a central recess of the outlet valve body, said actuating member being guided between said stops by said central recess of the outlet valve body.

10. A system disconnector according to claim 9, characterised in that
   (a) a valve seat of said upstream backflow preventer is arranged in said central recess of said actuating member; and
   (b) a spring biased upstream backflow preventer valve body of said upstream backflow preventer is arranged on said valve seat.

11. A system disconnector according to claim 10, characterised in that said valve seat of said upstream backflow preventer is formed by an open seat body extending in an axial direction over the entire length of said backflow preventer and downstream defining a spring abutment of said backflow preventer.

* * * * *